United States Patent [19]

Ushijima

[11] 4,225,029
[45] Sep. 30, 1980

[54] AUTOMATIC TRANSMISSION FOR AUTOMOBILES

[75] Inventor: Fumihiro Ushijima, Toyota, Japan

[73] Assignee: Toyota Jidosha Kogyo Kabushiki Kaisha, Toyota, Japan

[21] Appl. No.: 827,724

[22] Filed: Aug. 25, 1977

[30] Foreign Application Priority Data

Sep. 13, 1976 [JP] Japan .................. 51-109679

[51] Int. Cl.³ ............... F16D 67/02; F16D 67/00; F16H 3/74
[52] U.S. Cl. .................. 192/12 C; 192/18 A; 192/56 F; 74/751; 74/DIG. 1
[58] Field of Search ............. 192/56 F, 41 R, 12 C, 192/17 A, 18 A; 74/751, 54

[56] References Cited

U.S. PATENT DOCUMENTS

| | | | |
|---|---|---|---|
| 2,642,971 | 6/1953 | Hagenbook | 192/565 |
| 2,766,864 | 10/1956 | Shilling | 192/85 R |
| 3,251,245 | 5/1966 | Foerster | 74/751 |
| 3,482,669 | 12/1969 | Foster | 192/85 AA |
| 3,563,115 | 2/1971 | Iijima | 74/763 |
| 3,675,512 | 7/1972 | Hirozawa | 74/869 |
| 3,719,259 | 3/1973 | Burcz | 192/54 |
| 3,900,089 | 8/1975 | Ivey | 192/85 AA |
| 4,083,442 | 4/1978 | Ushijima | 192/56 F |

*Primary Examiner*—Samuel Scott
*Assistant Examiner*—Gerald Anderson
*Attorney, Agent, or Firm*—Stevens, Davis, Miller & Mosher

[57] ABSTRACT

An automatic transmission for automobiles having a gear means, a clutch and a brake, the engagement and disengagement of the clutch and the brake being changed over four shifting speed stages, wherein one of the mutually engageable friction elements of the brake is mounted to a housing of the transmission so as to be rotatably shiftable with respect to the housing through a small angle so that forward or backward rotary shifting of the friction element mechanically operates a timing valve which controls supply or exhaust of oil pressure to or from the brake.

5 Claims, 7 Drawing Figures

AUTOMATIC TRANSMISSION FOR AUTOMOBILES

BACKGROUND OF THE INVENTION

The present invention relates to an automatic transmission for automobiles, and, more particularly, to an improvement of an automatic transmission for automobiles with regard to the control of its speed shift timing.

In an automatic transmission for automobiles including a gear means and a plurality of friction engaging means and adapted to establish various speed shift stages in accordance with selective engagement of said friction engaging means, if the timing of changing over the operation of the friction engaging means is not properly controlled, poor shift performance, such as to cause a shock to or a temporary revving-up of the engine, is caused. Conventionally, as a means for accomplishing smooth shifting in an automatic transmission for automobiles, it has been proposed to incorporate a one-way clutch in the transmission, and it is actually practiced to incorporate a one-way clutch in the shifting structure for changing over the 1st and 2nd speed stages. However, if one-way clutches are incorporated in all the shifting structures for changing over various speed stages, the automatic transmission will become unduly big and expensive. Furthermore, since a one-way clutch idles in the reverse direction, it nullifies engine braking, thereby making it necessary to provide another means for effecting engine braking, thereby making the structure of an automatic transmission more complicated. Therefore, it is desirable that the timing for engaging and disengaging friction engaging means such as clutches and brakes is properly controlled without employing one-way clutches.

SUMMARY OF THE INVENTION

It is therefore the primary object of the present invention to provide an improved automatic transmission for automobiles including means for properly controlling the timing for engaging and disengaging friction engaging means, wherein said means for controlling the operational timing of the friction engaging means incorporates a mechanical control structure which performs in accordance with the conditions of frictional engagement of friction engaging means and a timing valve which is actuated by said mchanical control structure and controlling supply and exhaust of oil pressure to the servo means of the friction engaging means.

Another object of the present invention is to provide an automatic transmission for automobiles having upshift timing control means which rapidly exhausts oil pressure from a low speed friction engaging means thereby rapidly disengaging the low speed friction engaging means when a high speed friction engaging means is engaged so far that it transmits a predetermined medium level of torque.

Still another object of the present invention is to provide an automatic transmission for automobiles having a downshift timing control means which the supply of oil pressure to an oil servo means of a low speed friction engaging means when the low speed friction engaging means is engaged so far that it transmits a predetermined relatively low level of torque until a rotary member of a high speed friction engaging means completely stops its rotation after disengagement of the high speed friction engaging means.

A further object of the present invention is to provide an automatic transmission for automobiles having a downshift timing control means of the aforementioned type which further includes a means for compensating operation of the means for throttling the supply of oil pressure to said servo means of the low speed friction engaging means when the low speed friction engaging means is applied a reversing torque in engine braking condition.

Other objects of the present invention will be in part obvious and will be in part particularly pointed out in the following description.

BRIEF DESCRIPTION OF THE DRAWING

The present invention will become more fully understood from the detailed description given hereinbelow and the accompanying drawings which are given by way of illustration only and thus are not limitative of the present invention and wherein.

DESCRIPTION OF THE PREFERRED EMBODIMENT

Figure 1:
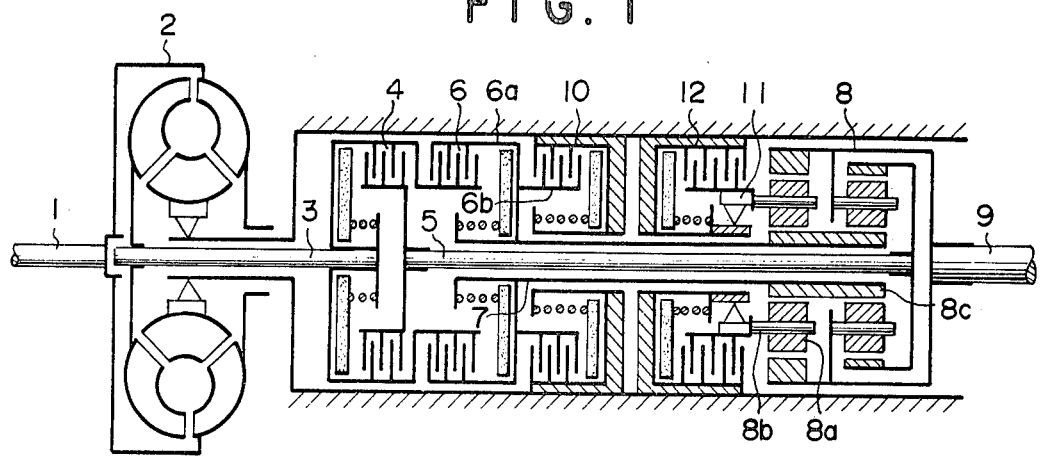
FIG. 1 is a rather diagrammatical sectional view showing an example of an automatic transmission for automobiles in which the present invention can be incorporated.

Referring to FIG. 1, the automatic transmission herein shown comprises a shaft 1 which is an output shaft of an engine not shown in the figure as well as an input shaft of a fluid torque converter 2, while a shaft designated by 3 forms an output shaft of the fluid torque converter as well as an input shaft of an assembly of gear means and friction engaging means. The shaft 3 is selectively connected with a first intermediate shaft 5 by means of a front clutch 4 and is also selectively engaged with a second intermediate shaft 7 by means of a rear clutch 6. The first and second intermediate shafts 5 and 7 are connected with a planetary gear means 8 of the Simpson type having an output shaft 9. The rear clutch 6 has a rear clutch drum 6a forming one of the mutually engaging means of the rear clutch and having a hub portion 6b which also forms a part of the friction engaging means providing a front brake 10. Pinions 8a of the planetary gear means 8 are supported by a carrier 8b, while a one-way clutch 11 and a rear brake 12 are connected with the carrier 8b so as selectively to brake the rotation of the carrier 8b.

As well known by those having ordinary skill in the art, when the front clutch 4 is engaged, the transmission operates in the 1st speed condition, wherein the output shaft 9 rotates in the same direction as the input shaft 3 at the largest reduction ratio. In this case, the one-way clutch 11 is automatically engaged. If the rear brake 12 is also engaged, the input shaft 3 can be reversely driven by the output shaft 9, whereby engine braking can be effected. When the front clutch 4 and the front brake 10 are engaged, the transmission operates in the 2nd speed condition. In this case, the output shaft 9 is driven by the input shaft 3 in the same direction at a medium reduction ratio. When the front clutch 4 and the rear clutch 6 are engaged, the transmission operates in the 3rd speed condition or in the directly connected condition, wherein the output shaft 9 is driven by the input shaft 3 in the same direction at the reduction ratio of 1. When the rear clutch 6 and the rear brake 12 are engaged, the transmission operates in the reverse condition wherein the output shaft 9 is driven by the input shaft 3 in the reverse direction at a large reduction ratio.

In this type of transmission, the present invention may conveniently be incorporated for controlling the timing of upshift and downshift between the 2nd speed and the 3rd speed.

Figure 2:
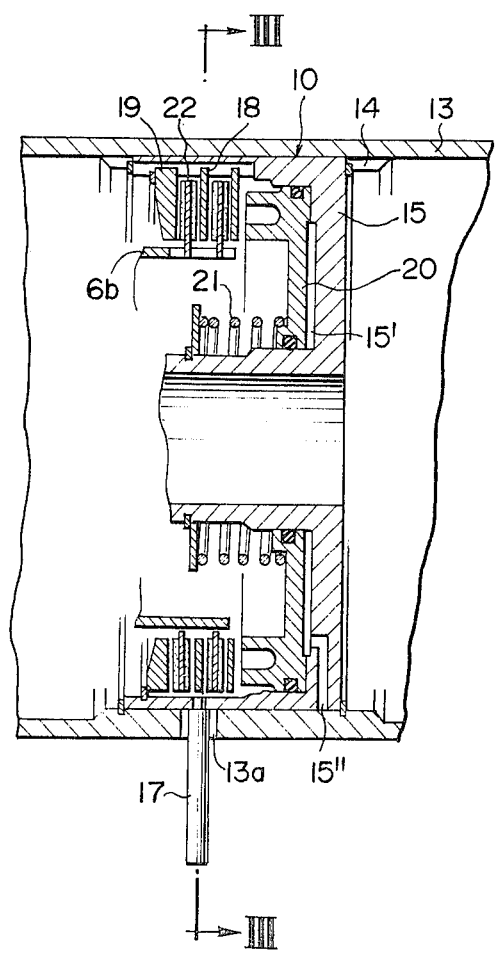
FIG. 2 is a partial sectional view corresponding to a part of the automatic transmission shown in FIG. 1 in which the present invention is incorporated.
Figure 3:
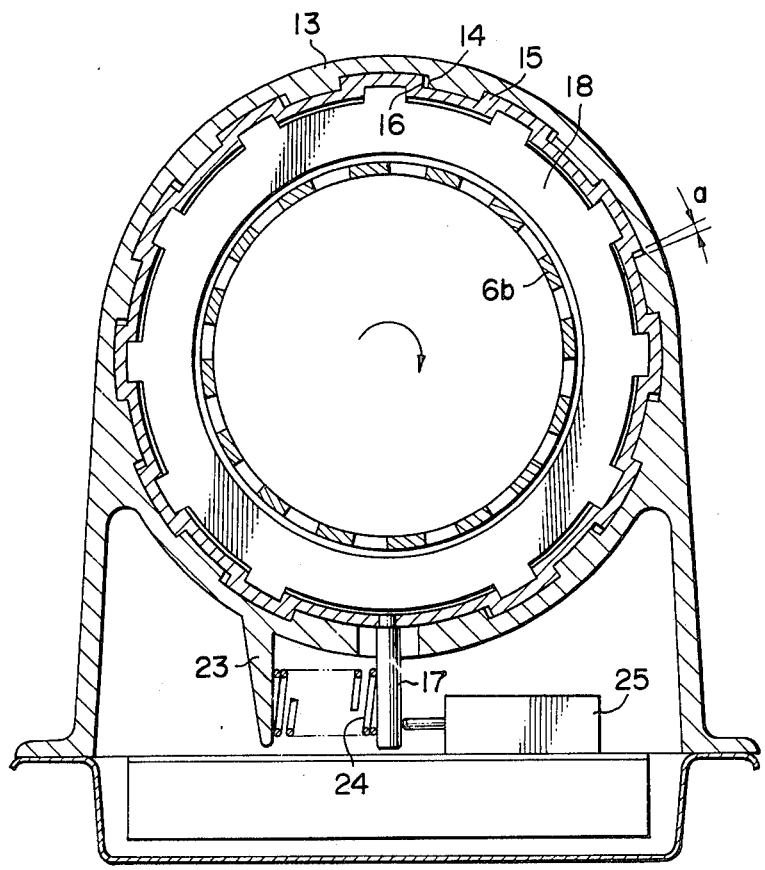
FIG. 3 is a cross-sectional view along line III—III in FIG. 2.

Referring next to FIGS. 2 and 3, the transmission housing designated by 13 has splines 14 formed at an inner wall portion thereof having a certain peripheral width, while the drum of the front brake 10 designated by 15 has splines 16 formed at its outer peripheral portion and having a certain peripheral width which is a little smaller than that of the splines 14 by an amount shown by a in FIG. 3. By this arrangement, the splines 16 engage the splines 14 so as to be rotatable to and fro by a small angle corresponding to the clearance a. The transmission housing has an opening 13a through which a rod 17 is passed and mounted to the drum 15 so that the rod 17 is angularly shifted around the central axis of the drum 15 as it rotates forward or rearward within a small angle corresponding to the clearance a.

At the inside of the drum 15 are mounted a plurality of annular plates 18 and a reaction plate 19 by means of a spline engagement as in the conventional structure, these plates serving as friction elements of the friction engaging means. Furthermore, an annular piston 20 is mounted in a corresponding annular cylinder bore formed in the drum 15 and is biased rightward in FIG. 2 by the action of a coil spring 21. The combination of the piston and cylinder constitute an oil servo means for operating the front brake 10. Between the annular plates 18 as well as between the annular plate 18 and the reaction plate 19 are provided annular lining plates 22 which are connected with the hub portion 6b of the rear clutch drum 6a by means of a spline engagement. As obvious from the structure shown in FIG. 2, when oil pressure is supplied to a cylinder chamber 15' through a passage 15", the piston 20 is driven leftward in FIG. 2 so that the friction elements 18, 19, and 22 are pressed together so as to engage frictionally with one another thereby putting the rear brake 10 into operation so as to restrict the rotation of the rear clutch drum 6a as well as the sun gear 8c of the planetary gear means 8 connected therewith. As shown in FIG. 3, a compression coil spring 24 is provided so as to act between the rod 17 and a support lug 23 formed in the transmission housing, said spring serving resiliently to turn the drum 15 in the anti-clockwise direction as seen in FIG. 3 which is opposite to the direction of normal rotation of the clutch drum 6a as shown by an arced arrow in FIG. 3. 25 designates a timing valve adapted to be mechanically operated by the rod 17 and to control supply and exhaust of oil pressure to and from the oil servo means of the front brake 10.

Figure 4:
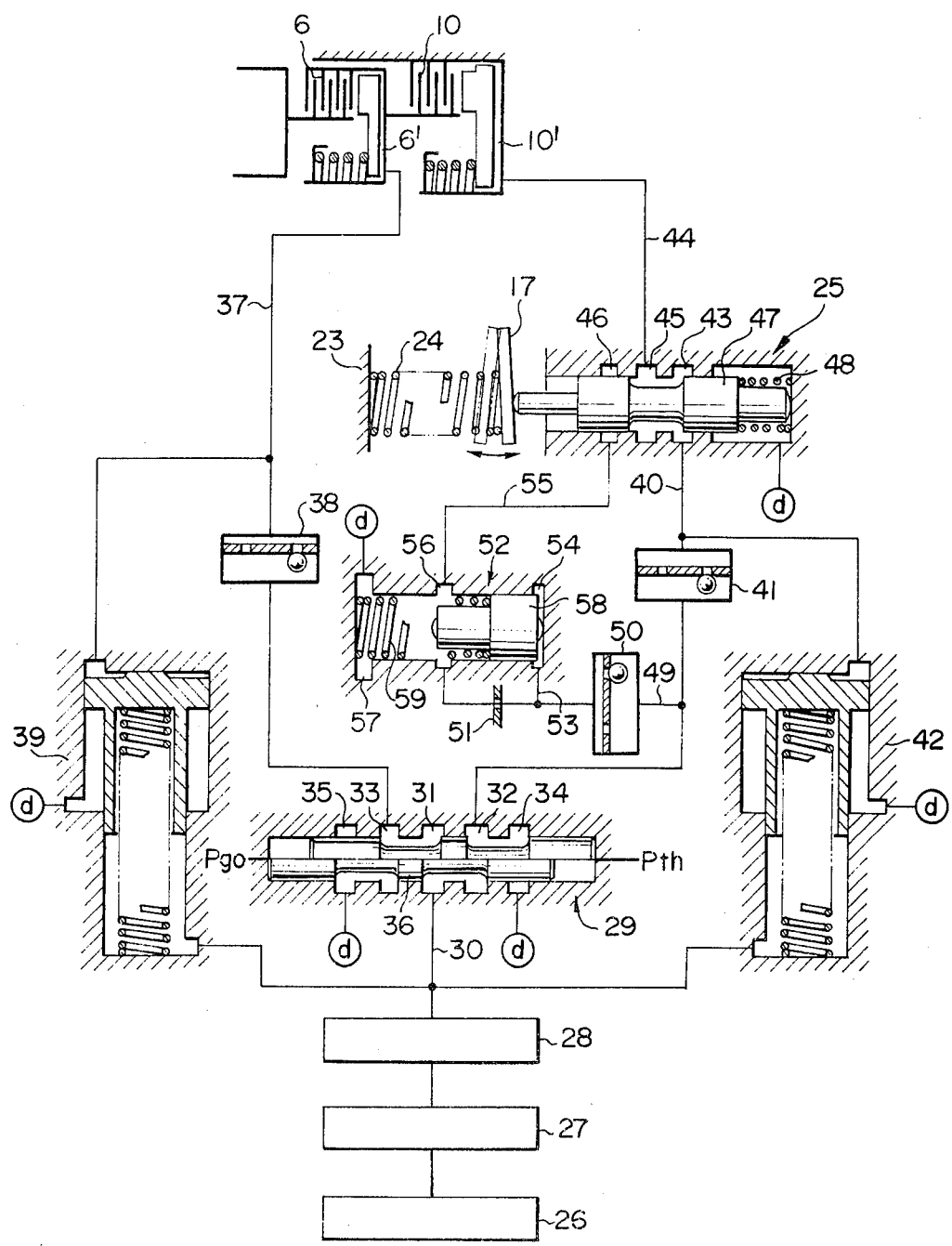
FIG. 4 is a diagram showing an oil pressure circuit means incorporated in the automatic transmission of the present invention.

FIG. 4 is a diagram showing an oil pressure circuit means for operating the rear clutch 6 and the front brake 10. In the diagram, blocks 26, 27, and 28 represent a source means of oil pressure such as one including an oil reservoir and an oil pump, a line pressure regulating valve and a 1-2 shift valve, respectively. These control elements may be of any conventional types which are well known in the art. The 1-2 shift valve 28 delivers a line pressure in the passage 30 when it is shifted to its upshift position for effecting the 2nd or higher speed stage. 29 designates a 2-3 shift valve having a port 31 in which the line pressure conducted through the passage 30 is supplied. The line pressure supplied to the port 31 is selectively supplied to a port 32 or a port 33 in accordance with the shifting operation of a valve spool 36, while the ports 32 and 33 are selectively connected to drain ports 34 and 35, respectively, in accordance with the shifting of the valve spool 36. The shifting of the valve spool 36 between the two positions as shown in the upper and lower halves in the figure is effected by the balance of the throttle pressure $P_{th}$ which increases in accordance with the operation of the accelerator pedal and the governor pressure $P_{go}$ which increases as the vehicle speed increases. When the spool 36 is shifted leftward in the figure, the line pressure is conducted to the port 32 so as to be finally supplied to the oil servo means 10' of the front brake 10 while the port 33 connected with an oil servo means 6' of the rear clutch 6 is connected to the drain port 35 so as to exhaust oil pressure from the oil servo means 6.' On the other hand, when the spool 36 is shifted rightward in the figure, the line pressure supplied through the passage 30 is conducted to the port 33 so as to be supplied to the oil servo means 6' of the rear clutch 6, while the port 32 connected with the oil servo means 10' of the front clutch 10 is connected to the drain port 34 so as to exhaust oil pressure from the oil servo means 10'. As described before, when the front clutch 10 is engaged by the supply of oil pressure to the servo means 10', the transmission operates in the 2nd speed condition, while when the rear clutch 6 is engaged by the supply of oil pressure to the servo means 6', the transmission operates in the 3rd speed condition.

In the oil passage 37 connecting the port 33 of the 2-3 shift valve to the oil servo means 6' of the rear clutch is provided a throttling means 38, while an accumulator 39 is connected to the passage 37 at the downstream side of the throttling means 38 as seen from the side of the port 33. Similarly, in the passage 40 extending from the port 32 of the 2-3 shift valve toward the oil servo means 10' of the front brake 10 until it reaches the timing valve 25 is provided a throttling means 41, while an accumulator 42 is connected to the passage 40 at the downstream side of the throttling means 41 as seen from the side of the port 32.

The timing valve 25 has a port 43 connected with the passage 40, a second port 45 connected with the oil servo means 10' of the front brake 10 by means of a passage 44 and a third port 46, these ports being controlled by a spool element 47 biased leftward in the figure by a compression coil spring 48. As explained hereinunder, when the brake drum 15 of the front brake 10 is positively driven clockwise in FIG. 3 by the rotating clutch drum 6a by means of friction engagement of the front brake friction elements such as 18, 19, and 22, the rod 17 is biased leftward in FIG. 4 while compressing the compression coil spring 24. In this condition, the spool element 47 is shifted leftward in the figure by the action of the compression coil spring 48. In other conditions, the rod 17 as well as the spool element 47 are biased rightward in the figure by the action of the compression coil spring 24 which overcomes the action of the spring 48.

An oil passage 49 is branched from the passage 40 at the upstream side of the throttling means 41 as seen from the port 32, said passage 49 including a throttling means 50 and being connected to a second timing valve 52. In more detail, the timing valve 52 has a port 54 connected with the passage 49 at the downstream side of the throttling means 50, and a port 56 connected on the one hand with the passage 49 at the downstream side of the throttling means 50 by way of a throttling means 51 and connected on the other hand with the port 56 of the first timing valve 25 by way of a passage 55. The timing valve 52 also has a drain port 57. These ports are controlled by a spool element 58 biased rightward in the figure by a compression coil spring 59.

Figure 5:
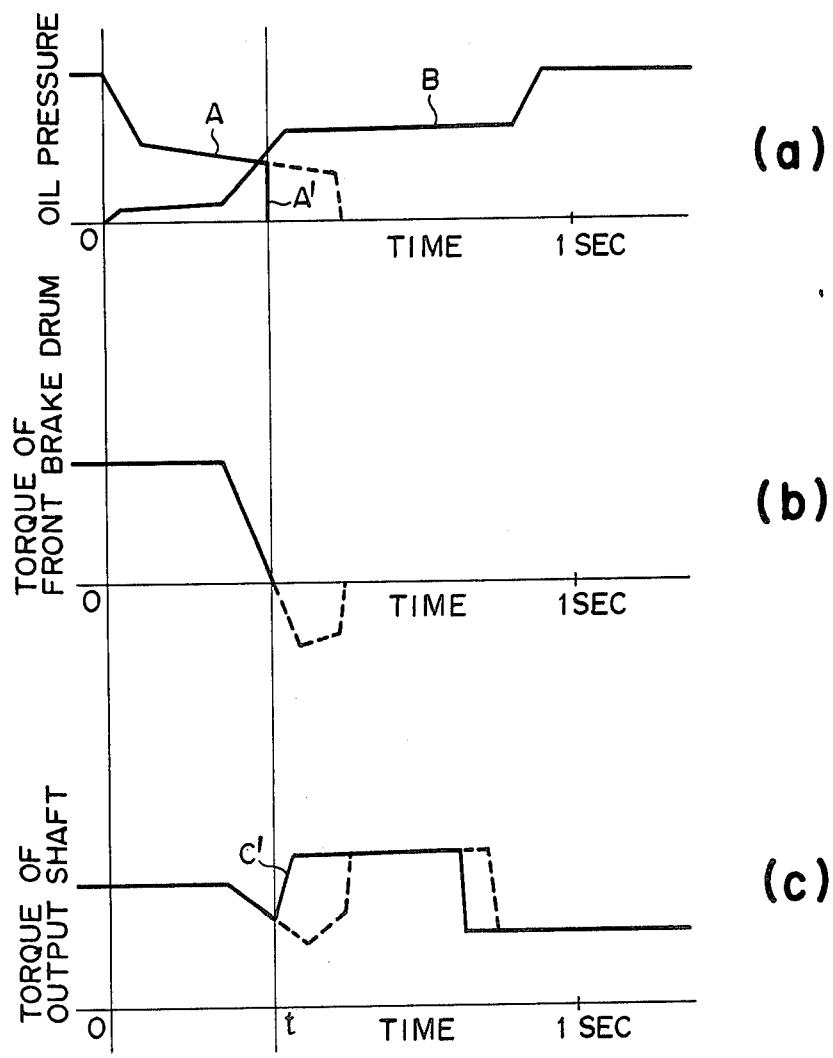
FIG. 5 shows graphs expressing upshift performances of the automatic transmission of the present invention.
Figure 6:
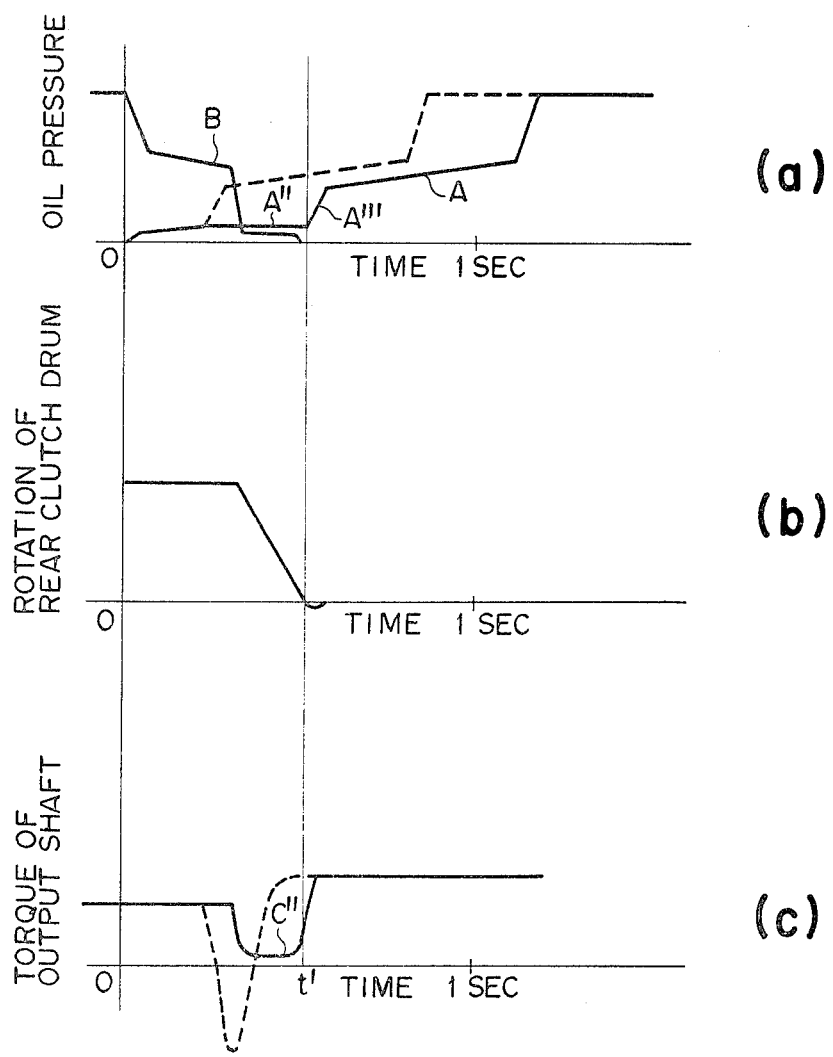
FIG. 6 shows graphs expressing downshift performances of the automatic transmission of the present invention.

The operation of the automatic transmission of the present invention will be explained with reference to FIGS. 5 and 6. When the transmission is operating in the 2nd speed condition, the front brake drum 15 is driven in the direction opposite to the normal direction so that the drum is maintained in the position as shown in FIG. 3. Therefore, the rod 17 is biased to the position as shown by solid lines in FIG. 4, thereby shifting the spool 47 of the timing valve 25 rightward as shown in FIG. 4. In this condition, the ports 43 and 45 of the timing valve 25 are connected with each other and the oil servo means 10' of the front brake 10 is supplied with oil pressure through the passage 40 including the throttling means 41 and the ports 43 and 45 of the timing valve 25. On the other hand, the oil servo means 6' of the rear clutch 6 is exhausted through the passage 37 including the throttling means 38 and through the port 33 of the 2-3 shift valve 29 to the drain port 35 thereof. Starting from this condition, when the 2-3 shift valve 29 is shifted up so that the spool 36 is shifted rightward in FIG. 4, the line pressure supplied to the port 31 through the passage 30 is then conducted through the port 33 and the passage 37 including the throttling means 38 to the oil servo means 6' of the rear clutch 6. In this case, as well known in the art, the clearance existing between the friction elements forming the rear clutch 6 and the provision of the throttling means 38 and the accumulator 39 produce a pressure building-up performance of the rear clutch 6 as shown by line B in FIG. 5(a). On the other hand, the oil pressure which has been supplied to the oil servo means 10' of the front clutch 10 is exhausted through the passage 44, the timing valve 25, the passage 40 including the throttling means 41, and the port 32 to the drain port 34. In this case, also as well known in the art, by the provision of the accumulator 42 and the throttle means 41, the oil pressure in the oil servo means 10' lowers in accordance with a process as shown by line A in FIG. 5(a). Thus, the rear clutch 6 is gradually engaged while the front brake 10 is gradually disengaged. In the initial stage of this upshifting wherein the friction engagement force of the rear clutch 6 is relatively low, it slips and does not transmit any substantial torque, and therefore the front brake drum 15 is maintained in the anticlockwise biased position as shown in FIG. 3. However, after the lapse of a time t, when the friction engaging action of the rear clutch 6 substantially increases as shown in FIG. 5(a), the rear clutch drum 6a having the hub portion 6b begins to rotate in the normal direction, i.e., clockwise in FIG. 3.

If the front brake 10 is still engaged in such a condition, a heavy wearing of the lining plates 22 will be caused. However, in accordance with the present invention, when the rear clutch 6 is substantially engaged, as at the time point t in FIG. 5(a), the front brake drum 15 is rotated clockwise in FIG. 3 as much as the clearance a thereby biasing the rod 17 leftward in FIG. 4 to the position as shown by phantom lines so that the spool 47 of the timing valve 25 is shifted leftward in the figure, whereupon the port 45 is connected to the port 46 and, accordingly, the oil pressure of the oil servo means 10' is now abruptly drained through the passage 55 and the port 56 of the second timing valve 52 to the drain port 57 thereof. Therefore, the oil pressure of the oil servo means 10' of the front brake 10 is rapidly reduced to zero as shown by line A' in FIG. 5(a). In relation with this, the torque applied to the front brake drum 15 lowers to zero as shown in FIG. 5(b). In this upshifting, the torque of the output shaft varies as shown in FIG. 5(c), wherein it will be noted that the torque is rapidly resumed from the time point t as shown by line C' and that the fluctuation of torque caused by upshifting is relatively small.

When the front brake 10 has been completely disengaged, the plates 18 and 19 are completely disengaged from the lining plate 22, whereby the drum 15 is again rotated anticlockwise as seen in FIG. 3 by the action of the spring 24 thereby shifting the spool element 47 of the timing valve 25 rightward in FIG. 4 thereby connecting the ports 43 and 45 with each other.

In FIG. 5(a)-(c), broken lines included in the performance lines show the performances which will be effected if the present invention is not incorporated in the automatic transmission. In more detail, if the timing control of the present invention is not performed, the complete disengagement of the front brake 10 is delayed beyond the time point t, whereby the front brake drum 15 is given a negative torque, and, therefore, the torque of the output shaft is correspondingly reduced thereby causing a greater torque variation during the upshifting, which will cause a strong shift shock.

When the transmission is shifted down from the 3rd speed condition to the 2nd speed condition, the 2-3 shift valve 29 is shifted from the rightward shift position to the leftward shift position as seen in FIG. 4. Then, the oil pressure which has been supplied to the oil servo means 6' of the rear clutch 6 is now exhausted through the passage 37 including the throttle means 38, port 33 and the drain port 35. As well known in the art, due to the provision of the accumulator 39 and the throttle means 38, the oil pressure in the oil servo means 6' lowers in a manner as shown by line B in FIG. 6(a). On the other hand, oil pressure is supplied through the passage 40, the timing valve 25 and the passage 44 to the oil servo means 10' of the front brake 10, whereby the piston 20 of the front clutch is shifted leftward in FIG. 2 so as to cancel the clearance existing between the plates 18, 19 and the lining plates 22. When these friction elements slightly contact with each other while the drum 6a of the rear clutch is rotating in the normal direction, the front brake drum 15 is dragged to rotate in the same direction as the rear clutch drum 6a thereby biasing the rod 17 slightly leftward in FIG. 4 thereby allowing the spool element 47 of the timing valve 25 to move correspondingly slightly leftward in the figure under the action of the compression coil spring 48 so far as to throttle the oil passage connecting the passages 40 and 44. Consequently, pressure rise in the oil servo means 10' is delayed as shown by part A" in line A in FIG. 6(a). On the other hand, after the rear clutch 6 has been substantially disengaged, the rotation of the drum 6a in the normal direction is rapidly decelerated so as to come to stoppage at time point t' and is then slightly reversed, as shown in FIG. 6(b). Corresponding to this behaviour of the rear clutch drum 6a, the rod 17 connected with the front brake drum 15 is returned to its rightward shifted position as shown by solid lines in FIG. 4 thereby releasing the throttling action which has been applied to the passage connecting the ports 43 and 45. Consequently, at the time point t', the oil pressure supplied to the oil servo means 10' of the front brake 10 steppingly increases as shown by part A''' in FIG. 6(a). The front brake 10 is substantially engaged at this time point. By the provision of such a timing arrangement, only a relatively small reduction of the torque of the output shaft is caused during downshifting as shown by curve C" in FIG. 6(c), and a smooth downshifting is accomplished. In FIG. 6, broken lines show the behaviour of the oil pressure in the oil servo means 10' and of the torque of the output shaft which will be obtained when the transmission does not incorporate the timing arrangement of the present invention. In more detail, if the present invention is not incorporated, the front brake 10 is substantially engaged while the rear clutch 6 is still substantially engaged, whereby the torque of the output shaft is greatly reduced so as temporarily to become negative thereby causing a strong shock in the downshifting.

When the transmission is shifted down from the 3rd speed stage to the 2nd speed stage while the vehicle is running in engine brake condition, the rear clutch drum 6a is being driven in the normal direction from the side of the output shaft 9. Therefore, if the friction elements 18, 19 and 22 of the front brake 10 begin to contact, the front brake drum 15 is dragged by the forwardly rotating rear clutch drum 6a so as to be biased in the direction of the normal rotation. In this condition, therefore, the rod 17 is shifted to the position as shown by phantom lines in FIG. 4 thereby allowing the spool element 47 of the timing valve 25 to shift leftward in the figure so as to isolate the port 45 from the port 43 while connecting the port 45 to the port 46. However, by the time when the friction elements 18, 19 and 22 in the front brake 10 begin to contact, the spool element 58 of the second timing valve 52 is already shifted leftward so far as to isolate the port 56 from the drain port 57 and, therefore, the supply of oil pressure to the oil servo means 10' of the front brake is continued through the supply system including the passage 49, throttle means 50 and 51, port 56, passage 55, ports 46 and 45 and passage 44. Thus, the downshifting operation is performed in substantially the same manner as in the downshifting in engine drive condition.

Figure 7:
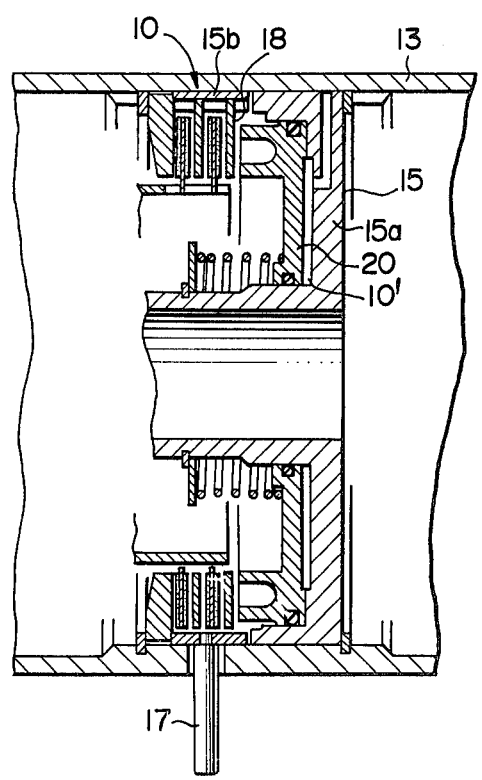
FIG. 7 is a view similar to FIG. 2, showing a modification of the present invention.

FIG. 7 shows a modification of the structure of the front brake 10. In this modification, the front brake drum 15 is divided into a servo portion 15a immovably mounted to the transmission housing 13 and a spline portion 15b rotatably mounted to the housing 13 in a manner similar to that shown in FIG. 3. The rod 17 is connected to the spline portion 15b and is biased in the same manner as in the basic embodiment so as to be shifted between two positions as shown by solid and phantom lines in FIG. 4 in accordance with rotary shiftings of the spline portion 15b. In the structure shown in FIG. 7, since the servo portion 15a is constructed as a fixed structure, the arrangement for the passage 15" is made easier.

Although the invention has been shown and described with respect to some preferred embodiments thereof, it should be understood by those skilled in the art that various changes and omissions of the form and detail thereof may be made therein without departing from the scope of the invention.

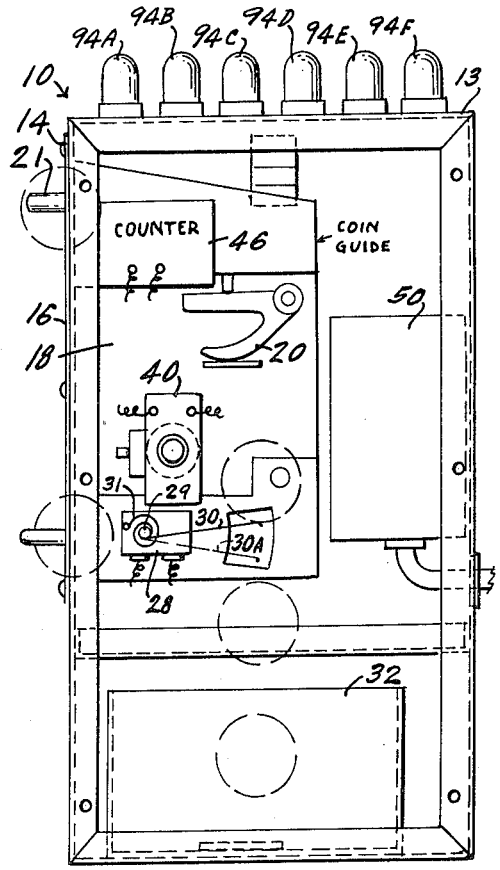

I claim:

1. An automatic transmission for automobiles, comprising a housing having an opening therethrough, an input shaft, an output shaft, a gear means having a power input element, a first friction engaging means including a first oil servo means and selectively connecting said input shaft with said power input element, a second friction engaging means including a second oil servo means and selectively braking said power input element, the engagement of said first friction engaging means effecting a first speed stage while the engagement of said second friction engaging means effects a second speed stage, said second friction engaging means having first and second mutually engageable friction elements and a spline member which engages said first friction elements, a projection fixedly secured to said spline member and extending substantially radially therefrom so as to pass through said opening in said housing, said spline member being mounted to said housing to be rotatable in it with respect to it through a small angle, said second friction element being connected with said power input member, means for biasing said spline member in a first rotational direction in said housing, said power input member being driven by said input shaft in a second rotational direction opposite to said first rotational direction when said first friction engaging means is engaged in engine driving, said power input member being driven by said output shaft in said second rotational direction when said second friction engaging means is engaged in engine braking, said power input member being driven by the reaction to rotation of said output shaft in said first rotational direction when said second friction engaging means is engaged in engine driving, and an oil pressure circuit means including a source means of oil pressure, a shift valve for changing over supplying of oil pressure from said source means to one of said first and second oil servo means while changing over exhausting of oil pressure from the other of said first and second oil servo means, a first timing valve shiftable by said projection in accordance with a small rotation of said spline member relative to said housing so as to throttle the supply of oil pressure from said source means to said second oil servo means when said spline member is rotated relative to said housing for a medium rotational angle in said second rotational direction and so as to rapidly exhaust oil pressure from said second oil servo means when said spline member is rotated relative to said housing in said second rotational direction beyond said medium rotational angle, and a second timing valve adapted to be shifted by the oil pressure supplied to said second oil servo means so as to intercept the exhausting of said second oil servo means by said first timing valve while establishing another passage for supplying oil pressure to said second oil servo means when a predetermined time has lapsed after the initiation of the supply of oil pressure from said source means to said second oil servo means.

2. The transmission of claim 1, wherein said second spline member has outer splines each having a first

United States Patent [19]

Kilman, Jr.

[11] 4,225,030
[45] Sep. 30, 1980

[54] AUTOMATIC INDICATOR FOR A GAME

[76] Inventor: Lowell E. Kilman, Jr., 3121 Keemont, Toledo, Ohio 43613

[21] Appl. No.: 952,474

[22] Filed: Oct. 18, 1978

[51] Int. Cl.³ ............................................. G07F 17/32
[52] U.S. Cl. ............................... 194/12; 235/92 GA; 235/92 CN; 340/381
[58] Field of Search ........................ 194/1 R, 1 L–1 N, 194/9 R, 12, 16; 235/92 C, 92 CN, 92 GA; 340/323 R, 381; 200/DIG. 23, DIG. 3, 61.1; 362/95, 251; 307/12, 41, 143

[56] References Cited

U.S. PATENT DOCUMENTS

| | | | |
|---|---|---|---|
| 2,658,168 | 11/1953 | Matson | 194/12 X |
| 2,665,791 | 1/1954 | Caruso | 194/9 R |
| 3,731,066 | 5/1973 | Menke | 194/9 R X |

Primary Examiner—Stanley H. Tollberg
Assistant Examiner—Edward M. Wacyra
Attorney, Agent, or Firm—George R. Royer

[57] ABSTRACT

An electrical-mechanical device comprised of coin counters and electrical indicators to register and determine the number of plays or games a player has payed for, in coin, for a round of a given game; the subject device being comprised of a coin receptacle designed to receive and register a number of coins inserted for playing a number of games, with an electrical-mechanical register to indicate the exact number of coins placed in the receptacle for a given game. A master register control panel is provided for canceling any previously activated indicators after a given game.

3 Claims, 6 Drawing Figures